United States Patent [19]
Amato

[11] Patent Number: 5,918,611
[45] Date of Patent: *Jul. 6, 1999

[54] ANIMAL UMBRELLA

[76] Inventor: Michael Amato, 10 Bruce Ter., Jackson, N.J. 08527

[ * ] Notice: This patent is subject to a terminal disclaimer.

[21] Appl. No.: 08/825,908

[22] Filed: Apr. 2, 1997

[51] Int. Cl.⁶ ..................................................... A01K 1/06
[52] U.S. Cl. ............................... 135/16; 135/90; 135/96; 135/98; 119/858
[58] Field of Search .................................. 135/16, 90, 96, 135/98, 905; 119/850, 858; 54/80.1, 79.1

[56] References Cited

U.S. PATENT DOCUMENTS

| D. 324,117 | 2/1992 | Antoine . | |
|---|---|---|---|
| D. 324,943 | 3/1992 | Wu . | |
| D. 325,296 | 4/1992 | Wu . | |
| 1,460,821 | 7/1923 | Morris | 135/16 |
| 1,704,407 | 3/1929 | Rice | 135/98 |
| 2,223,253 | 11/1940 | Hamilton | 135/98 |
| 2,434,526 | 1/1948 | Thornton | 135/98 |
| 3,554,203 | 1/1971 | Hall, Sr. | 135/16 |
| 3,999,521 | 12/1976 | Puiello | 119/858 |
| 4,537,339 | 8/1985 | Pearson . | |
| 5,184,762 | 2/1993 | Nevitt | 119/858 |
| 5,199,383 | 4/1993 | Lagana | 119/858 |
| 5,353,977 | 10/1994 | Schiro, Jr. et al. | 135/16 |
| 5,546,970 | 8/1996 | Amato . | |

*Primary Examiner*—Beth Aubrey
*Attorney, Agent, or Firm*—Richard L. Miller, P. E.

[57] ABSTRACT

An animal umbrella that is adaptable to a conventional animal harness and collar. The animal umbrella includes a saddle, saddle attaching apparatus, a vertical shank, vertical shank attaching apparatus, and a foldable canopy. The saddle is detachably mounted to the conventional animal harness and is pivotally mounted to the conventional animal collar. The saddle has a lower surface. The saddle attaching apparatus detachably mounts the saddle to the conventional animal harness. The vertical shank has a proximal end with a cross section and a distal end with a cross section. The vertical shank is detachably mounted to the saddle at the proximal end of the vertical shank. The vertical shank attaching apparatus detachably mounts the vertical shank to the saddle. And, the foldable canopy is mounted to the distal end of the vertical shank.

19 Claims, 2 Drawing Sheets

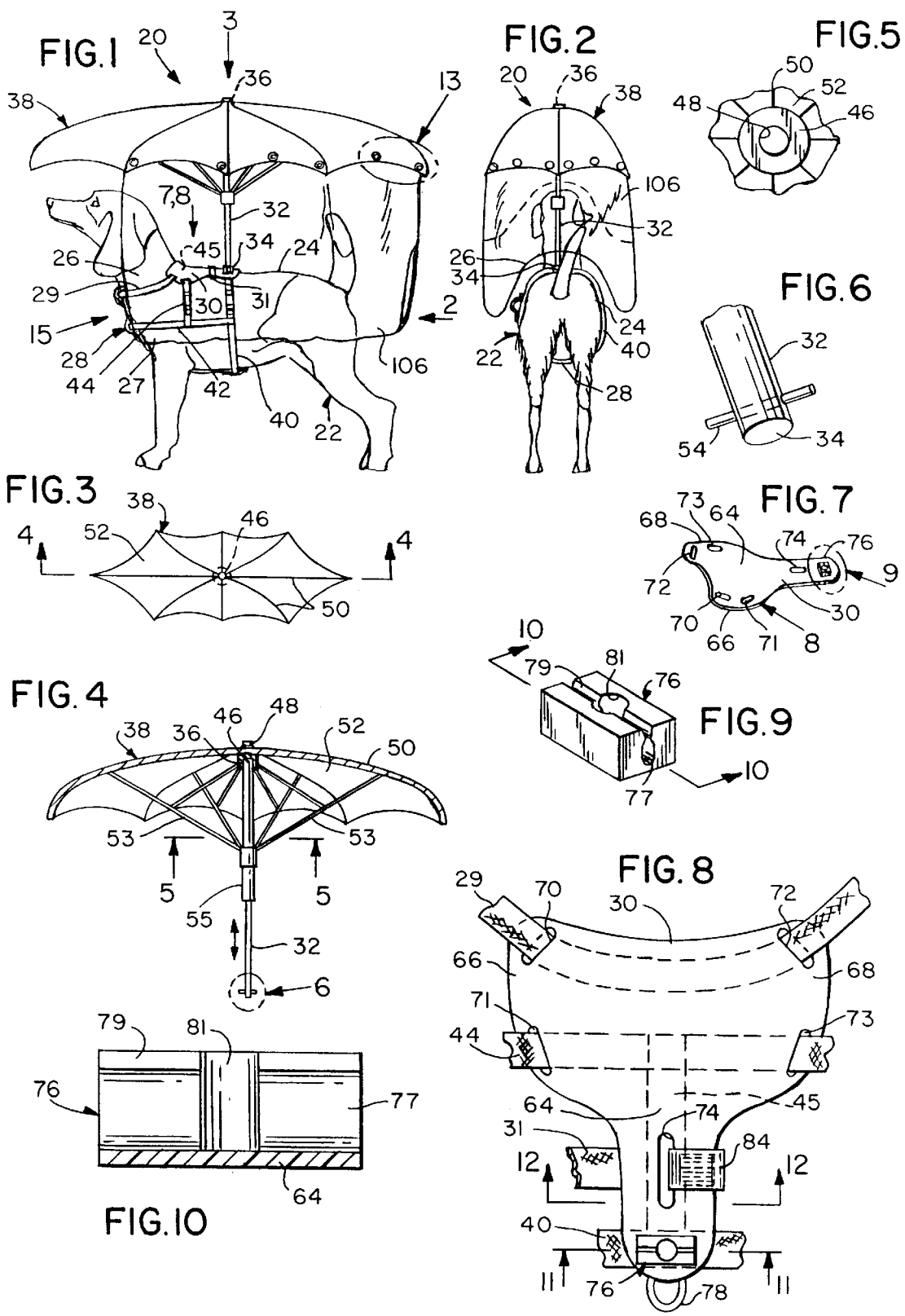

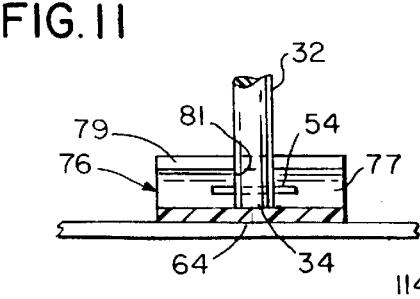
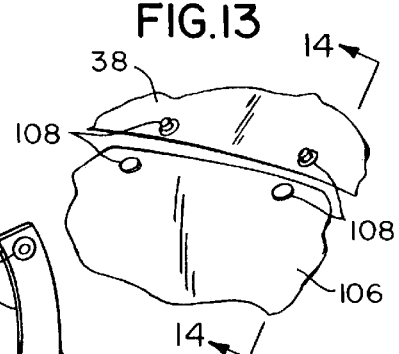
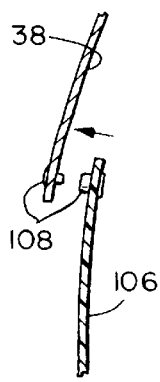
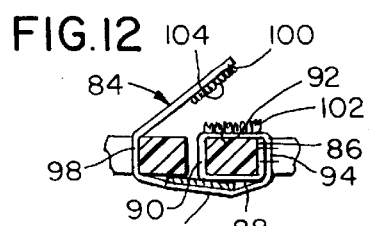
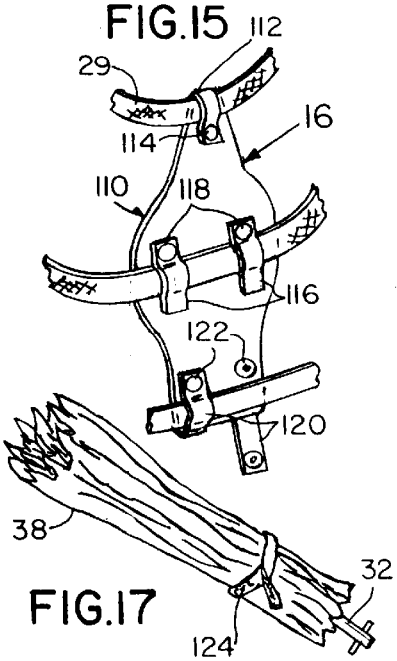
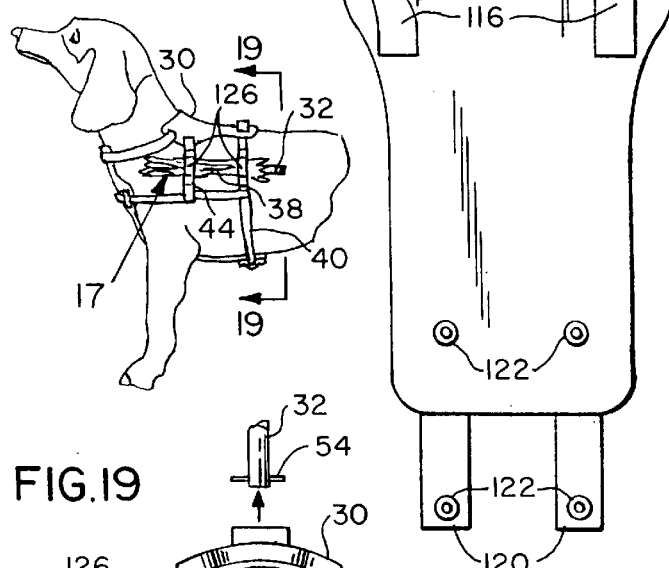
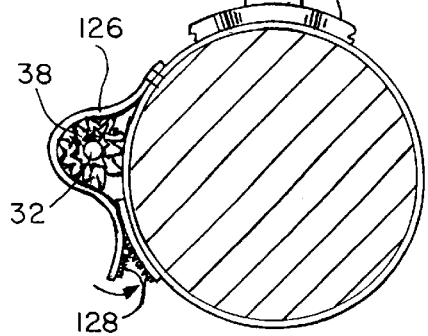

5,918,611

ANIMAL UMBRELLA

BACKGROUND OF THE INVENTION

1. Field of the Invention

The present invention relates to an animal umbrella. More particularly, the present invention relates to an animal umbrella that is adaptable to a conventional animal harness and collar.

2. Description of the Prior Art

Animals as well as humans require protection from the rain when they are being walked. It is not a simple task to have the walker hold an umbrella both over himself and the animal he is walking.

Numerous innovations for umbrella devices have been provided in the prior art that will be described. Even though these innovations may be suitable for the specific individual purposes to which they address, however, they differ from the present invention.

FOR EXAMPLE, U.S. Pat. No. D.324,117 to Antoine teaches an ornamental design for a dog umbrella that includes a curtain draping downwardly from the umbrella portion.

ANOTHER EXAMPLE, U.S. Pat. No. D.324,943 to Wu teaches an ornamental design for an animal umbrella that is in the form of a cap with pointed ears extending outwardly therefrom.

STILL ANOTHER EXAMPLE, U.S. Pat. No. D.325,296 to Wu teaches an ornamental design for an animal umbrella that is in the form of a cap with circular ears extending outwardly therefrom.

YET ANOTHER EXAMPLE, U.S. Pat. No. 4,537,339 to Pearson teaches a mount removably pivotally mounted to a user's body that includes a planar support having upper and lower pockets thereon to receive the handle of the umbrella. Straps are provided to secure the umbrella handle to the planar support.

FINALLY, STILL YET ANOTHER EXAMPLE, U.S. Pat. No. 5,546,970 to Amato teaches an animal umbrella that is adaptable to a conventional animal harness and collar. The animal umbrella includes a saddle, saddle attaching apparatus, a vertical shank, vertical shank attaching apparatus, and a rigid canopy. The saddle is detachably mounted to the conventional animal harness and is pivotally mounted to the conventional animal collar. The saddle has a lower surface. The saddle attaching apparatus detachably mounts the saddle to the conventional animal harness. The vertical shank has a proximal end with a cross section and a distal end with a cross section. The vertical shank is detachably mounted to the saddle at the proximal end of the vertical shank. The vertical shank attaching apparatus detachably mounts the vertical shank to the saddle. And, the rigid canopy is detachably mounted to the distal end of the vertical shank.

It is apparent that numerous innovations for umbrella devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide an animal umbrella that avoids the disadvantages of the prior art.

ANOTHER OBJECT of the present invention is to provide an animal umbrella that is simple and inexpensive to manufacture.

STILL ANOTHER OBJECT of the present invention is to provide an animal umbrella that is simple to use.

YET ANOTHER OBJECT of the present invention is to provide an animal umbrella that provides a shelter from rain sun and other elements for animals.

STILL YET ANOTHER OBJECT of the present invention is to provide an animal umbrella that is self-supporting.

YET STILL ANOTHER OBJECT of the present invention is to provide an animal umbrella that easily attaches to and detaches from a conventional animal harness and collar.

BRIEFLY STATED, STILL YET ANOTHER OBJECT of the present invention is to provide an animal umbrella that is adaptable to a conventional animal harness and collar wearable by an animal. The animal umbrella includes a saddle, saddle attaching apparatus, a vertical shank, vertical shank attaching apparatus, and a foldable canopy. The saddle is detachably mounted to the conventional animal harness and is pivotally mounted to the conventional animal collar. The saddle has a lower surface. The saddle attaching apparatus detachably mounts the saddle to the conventional animal harness. The vertical shank has a proximal end with a cross section and a distal end with a cross section. The vertical shank is detachably mounted to the saddle at the proximal end of the vertical shank. The vertical shank attaching apparatus detachably mounts the vertical shank to the saddle. And, the foldable canopy is mounted to the distal end of the vertical shank.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic side elevational view of the present invention installed on an animal;

FIG. 2 is a diagrammatic rear elevational view taken in the direction of arrow 2 in FIG. 1;

FIG. 3 is a diagrammatic top plan view taken in the direction of arrow 3 in FIG. 1 of the canopy of the present invention;

FIG. 4 is a cross sectional view taken on line 4—4 in FIG. 3 with parts broken away, illustrating the foldability of the present invention;

FIG. 5 is an enlarged partial section view taken on line 5—5 in FIG. 4 with parts broken away;

FIG. 6 is an enlarged diagrammatic perspective view of the area generally enclosed by the dotted circle identified by arrow 6 in FIG. 4 of the proximal end of the vertical shank of the present invention;

FIG. 7 an enlarged diagrammatic perspective view taken generally in the direction of arrow 7 in FIG. 1 of the saddle of the present invention;

FIG. 8 is an enlarged top plan view of taken generally in the direction of arrow 8 in FIG. 1 and arrow 8 in FIG. 7;

FIG. 9 is an enlarged diagrammatic perspective view of the area generally enclosed by the dotted ellipse identified by arrow 9 in FIG. 7 of the vertical shank retaining block of the present invention;

FIG. 10 is an enlarged cross sectional view taken on line 10—10 in FIG. 9;

FIG. 11 is a cross sectional view taken on line 11—11 in FIG. 8 illustrating the proximal end of the vertical shank engaged with the vertical shank retaining block;

FIG. 12 is a cross sectional view taken on line 12—12 in FIG. 8 illustrating the saddle attaching apparatus of the present invention;

FIG. 13 is a diagrammatic perspective view of the area generally enclosed by the dotted ellipse identified by arrow 13 in FIG. 1 illustrating the draping of the present invention being snapped to the canopy;

FIG. 14 is a cross sectional view taken on line 14—14 in FIG. 13;

FIG. 15 is an enlarged diagrammatic perspective view taken generally in the direction of arrow 15 in FIG. 1 of the breast plate of the present invention being snapped to the conventional harness and collar of the animal;

FIG. 16 is an enlarged diagrammatic front elevational view taken generally in the direction of arrow 16 in FIG. 15 of the breast plate;

FIG. 17 is a diagrammatic perspective view of the canopy in the folded position;

FIG. 18 is a diagrammatic side elevational view of the folded canopy of FIG. 17 stored on harness of the pet when not in use; and FIG. 19 is an enlarged cross sectional view taken on line 19—19 in FIG. 18 illustrating the replaceabilty of the folded canopy and the vertical shaft.

LIST OF REFERENCE NUMERALS UTILIZED IN THE DRAWING 10 animal umbrella of the present invention
22 animal
24 animal body
26 animal neck
27 animal breast
28 conventional animal harness
29 conventional animal collar
30 saddle
31 saddle attaching apparatus
32 vertical shank
34 vertical shank proximal end
36 vertical shank distal end
38 foldable canopy
40 harness long vertical strap
42 harness lower horizontal strap
44 harness short vertical strap
45 harness upper horizontal strap
46 canopy center cap
48 canopy center cap aperture
50 canopy plurality of ribs
52 canopy plurality of foldable webs
53 canopy plurality of pivoting arms
54 shank proximal end retaining rod
55 slide collar
64 saddle body portion
66 saddle upper left branch portion
68 saddle upper right branch portion
70 saddle upper left branch portion outboard slotted aperture
71 saddle upper left branch portion inboard slotted aperture
72 saddle upper right branch portion outboard slotted aperture
73 saddle upper right branch portion inboard slotted aperture
74 saddle body portion inboard slotted aperture
76 saddle body portion vertical shank retaining block
77 saddle body portion vertical shank retaining block horizontal throughbore
78 leash ring
79 saddle body portion vertical shank retaining block horizontal slot
81 saddle body portion vertical shank retaining block vertical bore
84 saddle attaching strap
86 saddle attaching strap fixed end portion
88 saddle attaching strap short lower portion
90 saddle attaching strap short inner portion
92 saddle attaching strap short upper portion
94 saddle attaching strap short outer portion
96 saddle attaching strap long lower portion
98 saddle attaching strap short opposite outer portion
100 saddle attaching strap free end portion
102 portion of hook and loop fasteners
104 mating portion of the hook and loop fasteners
106 drape
108 drape snaps
110 breast plate
112 breast plate collar strap
114 breast plate collar strap snap
116 breast plate first pair of straps
118 breast plate first pair of straps snaps
120 breast plate second pair of straps
122 breast plate second pair of straps snaps
124 canopy retaining strap
126 pair of canopy storing straps
128 canopy storing straps hook and loop fasteners

DETAILED DESCRIPTION OF THE PREFERRED EMBODIMENT

Referring now to the figures in which like numerals indicate like parts, and particularly to FIGS. 1 and 2, the animal umbrella of the present invention is shown generally at 20 installed on an animal 22 that has an animal body 24, an animal neck 26, and an animal breast 27.

The overall configuration of the animal umbrella 20 can best be seen in FIGS. 1 and 2, and as such, will be discussed with reference thereto.

The animal umbrella 20 is adaptable to a conventional animal harness 28 that is installable on the animal body 24 of the animal 22 and is also adaptable to a conventional animal collar 29 that is installable around the animal neck 26 of the animal 22.

The animal umbrella 20 includes a saddle 30 that is detachably mounted to the conventional animal harness 28 by saddle attaching apparatus 31 and pivotally mounted to the conventional animal collar 29, a vertical shank 32 having a vertical shank proximal end 34 and a vertical shank distal end 36, and a foldable canopy 38 that is disposed at the vertical shank distal end 36 of the vertical shank 32 and is foldable onto the vertical shank 32. The vertical shank 32 is detachably mounted to the saddle 30 at the vertical shank proximal end 34 of the vertical shank 32.

The configuration of the conventional animal harness 28 can best be seen in FIGS. 1 and 2, and as such, will be discussed with reference thereto.

The conventional animal harness 28 includes a harness long vertical strap 40 encircling the animal body 24 of the animal 22, a harness lower horizontal strap 42 extending forward of the harness long vertical strap 40 of the harness 28 and around the animal breast 27 of the animal 22, a harness short vertical strap 44 extending upwardly from the harness lower horizontal strap 42 of the harness 28 and around the top of the animal body 24 of the animal 22, and a harness upper horizontal strap 45 extending between the harness long vertical strap 40 of the harness 28 and the harness short vertical strap 44 of the harness 28.

The configuration of the foldable canopy 38 can best be seen in FIGS. 3–5, and as such will be discussed with reference thereto.

The foldable canopy 38 is in a substantially elongated rectangular shape and includes a canopy center cap 46 with a canopy center cap aperture 48 therein into which the vertical shank distal end 36 of the vertical shank 32 is mounted. The canopy center cap aperture 48 in the canopy center cap 46 of the foldable canopy 38 is preferably substantially circular-shaped.

Extending radially outwardly and downwardly from the canopy center cap 46 of the foldable canopy 38 are a canopy plurality of ribs 50 that are pivotally mounted to the canopy center cap 46 of the foldable canopy 38.

A canopy plurality of foldable webs 52 extend outwardly from the canopy center cap 46 of the foldable canopy 38 and connect each of the canopy plurality of ribs 50 of the foldable canopy 38 to each other.

A canopy plurality of pivoting arms 53 are pivotally mounted at ends thereof to the canopy plurality of ribs 50 of the foldable canopy 38, and pivotally mounted at other ends thereof to a slide collar 55 that is slidably mounted concentrically on the vertical shank 32 so as to allow the canopy plurality of pivoting arms 53 to collapse and cause the foldable canopy 38 to fold when the slide collar 55 is slid down the vertical shaft 32 and unfold when the slide collar 55 is slid up the vertical shaft 32.

The configuration of the vertical shank 32 can best be seen in FIG. 6, and as such, will be discussed with reference thereto.

For purposes of illustration, the vertical shank 32 preferably has a substantially circular-shaped cross section. The cross section of the vertical shank distal end 36 of the vertical shank 32, however, must match the cross section of the canopy center cap aperture 48 in the canopy center cap 46 of the foldable canopy 38.

The vertical shank 32 is preferably plastic or wood with a typical diameter preferably of ⅜ inch and a length preferably in the range of 12 to 14 inches.

The vertical shank proximal end 34 of the vertical shank 32 has a shank proximal end retaining rod 54 that extends perpendicularly outwardly therefrom from opposite sides thereof.

The configuration of the saddle 30 and its detachable arrangement with the shank proximal end 34 of the vertical shank 32 can best be seen in FIGS. 7–11, and as such, will be discussed with reference thereto.

The saddle 30 is a substantially Y-shaped member having a saddle body portion 64, a saddle upper left branch portion 66 extending upwardly and outwardly from the saddle body portion 64 of the saddle 30, and a saddle upper right branch portion 68 extending upwardly and outwardly from the saddle body portion 64 of the saddle 30, away from the saddle upper left branch portion 66 of the saddle 30.

The saddle upper left branch portion 66 of the saddle 30 has a saddle upper left branch portion outboard slotted aperture 70 and a saddle upper left branch portion inboard slotted aperture 71.

The saddle upper right branch portion 68 of the saddle 30 has a saddle upper right branch portion outboard slotted aperture 72 and a saddle upper right branch portion inboard slotted aperture 73. The saddle body portion 64 of the saddle 30 has a saddle body portion inboard slotted aperture 74 and a saddle body portion vertical shank retaining block 76 disposed outboard of the saddle body portion inboard slotted aperture 74 of the saddle body portion 64 of the saddle 30.

A leash ring 78 is pivotally mounted to the conventional animal harness 28 and is used to receive a standard leash (not shown).

As shown in FIG. 8, the conventional animal collar 29 passes freely through both the saddle upper left branch portion outboard slotted aperture 70 of the saddle upper left branch portion 66 of the saddle 30 and the saddle upper right branch portion outboard slotted aperture 72 of the saddle upper right branch portion 68 of the saddle 30, and as such, allows the saddle 30 to pivot therefrom.

The harness short vertical strap 44 of the conventional animal harness 28 passes freely through both the saddle upper left branch portion inboard slotted aperture 71 of the saddle upper left branch portion 66 of the saddle 30 and the saddle upper right branch portion inboard slotted aperture 73 of the saddle upper right branch portion 68 of the saddle 30.

The harness long vertical strap 40 of the conventional animal harness 28 passes freely under the saddle body portion 64 of the saddle 30 at the saddle body portion vertical shank retaining block 76 of the saddle body portion 64 of the saddle 30, so that the pressure exerted by the weight of the combination of the vertical shank 32 and the foldable canopy 38 is dissipated therealong.

The harness upper horizontal strap 45 of the conventional animal harness 28 extends under, and in alignment with, the saddle body portion inboard slotted aperture 74 of the saddle body portion 64 of the saddle 30.

As shown in FIGS. 9–11, the saddle body portion vertical shank retaining block 76 of the saddle body portion 64 of the saddle 30 is rectangular-parallelepiped-shaped, slightly resilient, and has a top and a saddle body portion vertical shank retaining block horizontal throughbore 77 extending longitudinally therethrough.

The saddle body portion vertical shank retaining block 76 of the saddle body portion 64 of the saddle 30 further has a saddle body portion vertical shank retaining block horizontal slot 79 extending longitudinally therethrough and opening into, and tapering downwardly from, the top of the saddle body portion vertical shank retaining block 76 of the saddle body portion 64 of the saddle 30 into, and being narrower than, the saddle body portion vertical shank retaining block horizontal throughbore 77 in the saddle body portion vertical shank retaining block 76 of the saddle body portion 64 of the saddle 30.

The saddle body portion vertical shank retaining block 76 of the saddle body portion 64 of the saddle 30 further has a saddle body portion vertical shank retaining block vertical bore 81 that opens into, and extends perpendicularly downwardly from, the top of the saddle body portion vertical shank retaining block 76 of the saddle body portion 64 of the saddle 30, perpendicularly into the saddle body portion vertical shank retaining block horizontal throughbore 77 in the saddle body portion vertical shank retaining block 76 of the saddle body portion 64 of the saddle 30, so that when the vertical shank proximal end 34 of the vertical shank 32 is placed in the saddle body portion vertical shank retaining block vertical bore 81 of the saddle body portion vertical shank retaining block 76 of the saddle body portion 64 of the saddle 30 with the shank proximal end retaining rod 54 of the vertical shank proximal end 34 of the vertical shank 32 lying in the saddle body portion vertical shank retaining block horizontal slot 79 in the saddle body portion vertical shank retaining block 76 of the saddle body portion 64 of the saddle 30, and a downward pressure is applied thereto, the shank proximal end retaining rod 54 of the vertical shank proximal end 34 of the vertical shank 32 causes the saddle body portion vertical shank retaining block horizontal slot 79 in the saddle body portion vertical shank retaining block 76 of the saddle body portion 64 of the saddle 30 to expand and open and let the shank proximal end retaining rod 54 of the vertical shank proximal end 34 of the vertical shank 32 pass therethrough and become captured in the saddle body portion vertical shank retaining block horizontal throughbore 77 in the saddle body portion vertical shank retaining block 76 of the saddle body portion 64 of the saddle 30 when the saddle body portion vertical shank retaining block horizontal slot 79 in the saddle body portion vertical shank retaining block 76 of the saddle body portion 64 of the saddle 30 contracts and returns to normal.

The configuration of the saddle attaching apparatus 31 can best be seen in FIGS. 8 and 12, and as such, will be discussed with reference thereto.

The saddle attaching apparatus 31 includes a saddle attaching strap 84. A saddle attaching strap fixed end portion 86 of the saddle attaching strap 84 is secured at a side of the saddle body portion 64 of the saddle 30. A saddle attaching strap short lower portion 88 extends from the saddle attaching strap fixed end 86 of the saddle attaching strap 84 and passes under the saddle body portion 64 of the saddle 30. A saddle attaching strap short inner portion 90 extends from the saddle attaching strap short lower portion 88 of the saddle attaching strap 84 upwardly through the saddle body portion inboard slotted aperture 74 of the saddle body portion 64 of the saddle 30. A saddle attaching strap short upper portion 92 extends from the saddle attaching strap short inner portion 90 of the saddle attaching strap 84 over the top of the saddle body portion 64 of the saddle 30. A saddle attaching strap short outer portion 94 extends from the saddle attaching strap short upper portion 92 of the saddle attaching strap 84 downwardly over the saddle attaching strap fixed end 86 of the saddle attaching strap 84 and is secured thereto. A saddle attaching strap long lower portion 96 extends from the saddle attaching strap short outer portion 94 of the saddle attaching strap 84 and passes the saddle attaching strap short lower portion 88 of the saddle attaching strap 84 until the opposite side of the saddle body portion 64 of the saddle 30. A saddle attaching strap short opposite outer portion 98 extends from the saddle attaching strap long lower portion 96 of the saddle attaching strap 84 upwardly along the opposite side of the saddle body portion 64 of the saddle 30. A saddle attaching strap free end portion 100 extends from the saddle attaching strap short opposite outer portion 98 of the saddle attaching strap 84 over the saddle attaching strap short upper portion 92 of the saddle attaching strap 84. A portion of hook and loop fasteners 102 is disposed at the saddle attaching strap short upper portion 92 of the saddle attaching strap 84 and a mating portion of the hook and loop fasteners 104 is disposed at the saddle attaching strap free end portion 100 of the saddle attaching strap 84.

The animal umbrella 20 further includes, as shown in FIGS. 1, 2, 13 and 14, a drape 106 that has an interior and is preferably transparent and is replaceably attached to the foldable canopy 38 at its periphery, by drape snaps 108, and extends downwardly therefrom, further at its sides than at its front and back. It is to be understood that the drape 106 is snapped under the canopy 38 so as to allow the rain and the like to run off the canopy without entering the interior of the drape 106 and wetting the animal.

The animal umbrella 20 further includes, as shown in FIGS. 15 and 16, a breast plate 110 that is replaceably attached to the conventional animal collar 29, by a breast plate collar strap 112 that extends from the breast plate 110, captures the conventional animal collar 29, and is snaplingly affixed to the breast plate 110 by a breast plate collar strap snap 114.

The breast plate 110 is replaceably attached to the conventional animal harness 28, by a breast plate first pair of straps 116 that extend from the breast plate 110, capture the harness lower horizontal strap 42 of the harness 28, and are snaplingly affixed to the breast plate 110 by a breast plate first pair of straps snaps 118.

The breast plate 110 is further replaceably attached to the conventional animal harness 28, by a breast plate second pair of straps 120 that extends from the breast plate 110, capture the harness long vertical strap 40 of the harness 28, and are snaplingly affixed to the breast plate 110 by a breast plate second pair of straps snaps 122.

As shown in FIGS. 17–19, once the foldable canopy 38 and vertical shaft 32 have been removed from the saddle 30, the slide collar 55 is slid down the vertical shaft 32 causing the foldable canopy 38 to fold therearound and be maintained therearound by a canopy retaining strap 124.

The folded foldable canopy 38 is replaceably stored generally horizontally on the harness 28 by a pair of canopy storing straps 126 that extend from the harness long vertical strap 40 of the harness 28 and the harness short vertical strap 44 of the harness 28, respectively, capture the folded foldable canopy 38, and are replaceably attached to the harness long vertical strap 40 of the harness 28 and the harness short vertical strap 44 of the harness 28, respectively, by canopy storing straps hook and loop fasteners 128 so as to provide a place for storing the foldable canopy 38 when not in use while allowing it to be readily available.

In operation, the conventional animal harness 28 is put on the animal body 24 of the animal 22 with the harness short vertical strap 44 of the harness 28 threaded through the saddle 30. The conventional animal collar 29, which has been threaded through the saddle 30, is put on the animal neck 26 of the animal 22.

The saddle 30 is pivoted downwardly and placed on the conventional animal harness 28 with the saddle attaching strap long lower portion 96 of the saddle attaching strap 84 passing under the harness upper horizontal strap 45 of the conventional animal harness 28. The saddle attaching strap free end portion 100 of the saddle attaching strap 84 is pulled tight and the portion of hook and loop fasteners 104 is affixed to the portion of the hook and loop fasteners 102 securing the saddle 30 in place on the conventional animal harness 28.

The vertical shank proximal end 34 of the vertical shank 32 is placed into the saddle body portion vertical shank retaining block vertical bore 81 of the saddle body portion vertical shank retaining block 76 of the saddle body portion 64 of the saddle 30 with the shank proximal end retaining rod 54 of the vertical shank proximal end 34 of the vertical shank 32 lying in the saddle body portion vertical shank retaining block horizontal slot 79 in the saddle body portion vertical shank retaining block 76 of the saddle body portion 64 of the saddle 30, and a downward pressure is applied thereto causing the shank proximal end retaining rod 54 of the vertical shank proximal end 34 of the vertical shank 32 to expand and open the saddle body portion vertical shank retaining block horizontal slot 79 in the saddle body portion vertical shank retaining block 76 of the saddle body portion 64 of the saddle 30 and let the shank proximal end retaining rod 54 of the vertical shank proximal end 34 of the vertical shank 32 pass therethrough and become captured in the saddle body portion vertical shank retaining block horizontal throughbore 77 in the saddle body portion vertical shank retaining block 76 of the saddle body portion 64 of the saddle 30 when the saddle body portion vertical shank retaining block horizontal slot 79 in the saddle body portion vertical shank retaining block 76 of the saddle body portion 64 of the saddle 30 contracts and returns to normal.

It will be understood that each of the elements described above, or two or more together, may also find a useful application in other types of constructions differing from the types described above.

While the invention has been illustrated and described as embodied in an animal umbrella, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An animal umbrella adaptable to a conventional animal harness and collar wearable by an animal, comprising:
    a) a saddle detachably mountable to the conventional animal harness and pivotally mountable to the collar; said saddle having a lower surface;
    b) saddle attaching means for detachably mounting said saddle to the conventional animal harness;
    c) a vertical shank having a proximal end with a cross section and a distal end with a cross section; said vertical shank being detachably mounted to said saddle at said proximal end of said vertical shank;
    d) vertical shank attaching means for detachably mounting said vertical shank to said saddle; and
    e) a foldable canopy mounted to said distal end of said vertical shank.

2. The umbrella as defined in claim 1, wherein said foldable canopy is substantially elongated rectangular-shaped.

3. The umbrella as defined in claim 1, wherein said foldable canopy includes a center cap with an aperture; said distal end of said vertical shank is mounted in said aperture in said center cap of said foldable canopy; said aperture in said center cap of said foldable canopy has a cross section that is substantially equal to said cross section of said distal end of said vertical shank.

4. The umbrella as defined in claim 3, wherein said cross section of said aperture in said center cap of said foldable canopy and said cross section of said distal end of said vertical shank are circular.

5. The umbrella as defined in claim 3, wherein said foldable canopy further includes a plurality of ribs that extend radially outwardly and downwardly from said center cap of said foldable canopy, and a plurality of foldable webs that extend outwardly from said center cap of said foldable canopy and connect each of said plurality of ribs of said foldable canopy to each other.

6. The umbrella as defined in claim 5, wherein said foldable canopy further includes a plurality of pivoting arms each having first and second end, the arms are pivotally mounted at said first ends thereof to said plurality of ribs of said foldable canopy, said first, and pivotally mounted at said second ends thereof to a slide collar that is slidably mounted concentrically on said vertical shank so as to allow said plurality of pivoting arms to collapse and cause said foldable canopy to fold when said slide collar is slid down said vertical shaft and unfold when said slide collar is slid up said vertical shaft.

7. The umbrella as defined in claim 1, wherein said vertical shank is selected from the group consisting of plastic and wood; said vertical shank has a diameter of ⅜ inch and a length in a range of 12 to 14 inches.

8. The umbrella as defined in claim 1, wherein said proximal end of said vertical shank has a retaining rod that extends perpendicularly outwardly therefrom from opposite sides thereof.

9. The umbrella as defined in claim 8, wherein said saddle is a substantially Y-shaped member that has a body portion, an upper left branch portion that extends upwardly and outwardly from said body portion of said saddle, and an upper right branch portion that extends upwardly and outwardly from said body portion of said saddle and away from said upper left branch portion of said saddle.

10. The umbrella as defined in claim 9, wherein said upper left branch portion of said saddle has an outboard slotted aperture and an inboard slotted aperture, said upper right branch portion of said saddle has an outboard slotted aperture and an inboard slotted aperture with the conventional animal collar passing freely through both said outboard slotted aperture in said upper left branch portion of said saddle and said outboard slotted aperture in said upper right branch portion of said saddle so as to allow said saddle to pivot therefrom and with a short vertical strap of the conventional animal harness passing freely through both said inboard slotted aperture in said upper left branch portion of said saddle and said inboard slotted aperture in said upper right branch portion of said saddle.

11. The umbrella as defined in claim 10, wherein said body portion of said saddle has an inboard slotted aperture and a retaining block disposed outboard of said inboard slotted aperture in said body portion of said saddle with a long vertical strap of the conventional animal harness passing freely under said body portion of said saddle at said retaining block of said body portion of said saddle, so that the pressure exerted by the weight of the combination of said vertical shank and said foldable canopy is dissipated therealong, and with an upper horizontal strap of the conventional animal harness extending under, and in alignment with, said inboard slotted aperture in said body portion of said saddle.

12. The umbrella as defined in claim 11, wherein said retaining block of said body portion of said saddle is rectangular-parallelepiped-shaped, slightly resilient, and has a top and a horizontal throughbore extending longitudinally therethrough; said retaining block of said body portion of said saddle further has a horizontal slot extending longitudinally therethrough and opening into, and tapering downwardly from, said top of said retaining block of said body portion of said saddle into, and being narrower than, said horizontal throughbore in said retaining block of said body portion of said saddle; said retaining block of said body portion of said saddle further has a vertical bore that opens into, and extends perpendicularly downwardly from, said top of said retaining block of said body portion of said saddle, perpendicularly into said horizontal throughbore in said retaining block of said body portion of said saddle, so that when said proximal end of said vertical shank is placed in said vertical bore in said retaining block of said body portion of said saddle with said retaining rod of said proximal end of said vertical shank lying in said horizontal slot in said retaining block of said body portion of said saddle, and a downward pressure is applied thereto, said retaining rod of said proximal end of said vertical shank causes said horizontal slot in said retaining block of said body portion of said saddle to expand and open and let said retaining rod of said proximal end of said vertical shank pass therethrough and become captured in said horizontal throughbore in said retaining block of said body portion of said saddle when said horizontal slot in said retaining block of said body portion of said saddle contracts.

13. The umbrella as defined in claim 11, wherein said saddle attaching means includes an attaching strap; said attaching strap includes a fixed end portion that is secured at a side of said body portion of said saddle, a short lower portion that extends from said fixed end of said attaching strap and passes under said body portion of said saddle, a short inner portion that extends from said short lower portion of said saddle attaching strap upwardly through said inboard slotted aperture in said body portion of said saddle, a short upper portion that extends from said short inner portion of said saddle attaching strap over said body portion of said saddle, a short outer portion that extends from said short upper portion of said saddle attaching strap downwardly over said fixed end of said saddle attaching strap and is secured thereto, a long lower portion that extends from said short outer portion of said saddle attaching strap and passes over said short lower portion of said saddle attaching strap, a short opposite outer portion that extends from said long lower portion of said saddle attaching strap upwardly along an opposite side of said body portion of said saddle, a free end portion that extends from said short opposite outer portion of said saddle attaching strap over said short upper portion of said saddle attaching strap, a hook and loop fastener, one of the hook and loop disposed at said short upper portion of said saddle attaching strap, and the other of said hook and loop disposed at said free end portion of said saddle attaching strap.

14. The umbrella as defined in claim 1; further comprising a drape having an interior and being replaceably attached to said foldable canopy at its periphery, by snaps, and extending downwardly therefrom, said drape being snapped under said foldable canopy so as to allow rain to run off said foldable canopy without entering said interior of said drape and wetting the animal.

15. The umbrella as defined in claim 14, wherein said drape is transparent.

16. The umbrella as defined in claim 1; further comprising a breast plate replaceably attachable to the collar, by a collar strap that extends from said breast plate, captures the collar, and is snaplingly affixed to said breast plate by a snap; said breast plate being replaceably attached to the conventional animal harness, by a first pair of straps that extend from said breast plate, capture a lower horizontal strap of the conventional animal harness, and are snaplingly affixed to said breast plate by a first pair of snaps; said breast plate being further replaceably attached to the conventional animal harness, by a second pair of straps that extends from said breast plate, capture a long vertical strap of the conventional animal harness, and are snaplingly affixed to said breast plate by a second pair of snaps.

17. The umbrella as defined in claim 1; further comprising a canopy retaining strap that maintains said foldable canopy around said vertical shaft once said foldable canopy and said vertical shaft have been removed from said saddle and said slide collar is slid down said vertical shaft causing said foldable canopy to fold therearound.

18. The umbrella as defined in claim 1; further comprising a pair of canopy storing straps that are adapted to replaceably store said foldable canopy generally horizontally on the conventional animal harness after said foldable canopy has been folded so as to form a folded foldable canopy; said pair of canopy storing straps extending from a long vertical strap of the conventional animal harness and a short vertical strap of the conventional animal harness, respectively, capture said folded foldable canopy, and are replaceably attached to the long vertical strap of the conventional animal harness and the short vertical strap of the conventional animal harness, respectively, by hook and loop fasteners so as to provide a place for storing said folded foldable canopy when not in use while allowing it to be readily available.

19. A method of utilizing an animal umbrella, comprising the steps of:

a) putting a conventional animal harness on a body of an animal with a vertical strap of the conventional animal harness threaded through a saddle of said animal umbrella;

b) putting a conventional animal collar on a neck of the animal after being threaded through said saddle;

c) pivoting downwardly said saddle and placing it on the conventional animal harness, with a long lower portion of a saddle attaching strap passing under an upper horizontal strap of the conventional animal harness, with a free end portion of said saddle attaching strap being pulled tight, and with a portion of hook and loop fasteners affixed to a mating portion of said hook and loop fasteners so as to secure said saddle in place on the conventional animal harness;

d) placing a proximal end of a vertical shank of said animal umbrella into a vertical bore in a retaining block of a body portion of said saddle with a retaining rod of said proximal end of said vertical shank lying in a horizontal slot in said retaining block of said body portion of said saddle; and e) applying a downward pressure to said vertical shank causing said retaining rod of said proximal end of said vertical shank to expand and open said horizontal slot in said retaining block of said body portion of said saddle and let said retaining rod of said proximal end of said vertical shank pass therethrough and become captured in a horizontal throughbore in said retaining block of said body portion of said saddle when said horizontal slot in said retaining block of said body portion of said saddle contracts and returns to normal.

* * * * *